July 27, 1954 A. D. SCARBROUGH ET AL 2,685,039

DIODE GATING CIRCUITS

Filed March 13, 1952

INVENTORS,
ELWOOD E. BOLLES,
BY ALFRED D. SCARBROUGH,
Seymour M. Rosenberg
ATTORNEY.

Patented July 27, 1954

2,685,039

UNITED STATES PATENT OFFICE 2,685,039

DIODE GATING CIRCUITS

Alfred D. Scarbrough, Pasadena, and Elwood E. Bolles, Los Angeles, Calif., assignors, by mesne assignments, to Hughes Aircraft Company, a corporation of Delaware Application March 13, 1952, Serial No. 276,254

7 Claims. (Cl. 307—88)

The present invention relates to diode gating circuits and more particularly to diode gating circuits which are fast acting but impose relatively negligible loading upon the source of signals controlling the operation of the gating circuits.

In the prior art, various types of diode gating circuits have been utilized extensively for performing the function of passing pulses under the control of the voltage level of a control signal. For example, it has been found that diode gating circuits, and more particularly crystal diode gating circuits, may be used to pass either positive or negative pulses when these pulses coincide in time with one voltage level of a control signal, or to inhibit the pulses when they coincide in time with another voltage level of the control signal.

Although gating circuits of this type find numerous applications in the electronic digital computer art, it has been found that the circuits fail to operate satisfactorily at relatively high speeds. One of the principal reasons for this failure is the inability of the gating circuit to turn on rapidly, that is the inability of the gating circuit to respond rapidly to changes in the control signal from its nonactuating level to its actuating level. Under these conditions, the gating circuit may pass a pulse which should be inhibited, or may inhibit a pulse which should be passed. In addition, gating circuits of this type often exhibit relatively high driving impedances which result in excessive external losses. Accordingly, pulses of relatively large amplitude must be applied to the gating circuit in order to produce output pulses of sufficient amplitude to perform the desired function.

Numerous attempts have been made to increase the speed of operation of diode gating circuits by decreasing the turn-on time. However, such attempts have generally resulted in increased loading upon the source of the control signal which, in some instances, has been so large as to result in rendering the control signal source inoperative. This result is particularly apparent where large amplitude output pulses are required.

The present invention discloses two embodiments of diode gating circuits which overcome the above and other disadvantages of the prior art gating circuits. According to the basic principle of the present invention, a diode is interposed between the input and output terminals of the gating circuit, the diode being arranged to conduct pulses applied to the input terminal to the output terminal only when operating in the forward direction. A direct-current reference potential is applied to one electrode of the diode, while the potential at the other electrode is varied in accordance with the variations in the potential of the control signal. By arranging the biasing potentials so that the diode is back-biased for all potential values of the control signal other than the passing potential, the gating circuit passes only those pulses which occur simultaneously with the passing potential of the control signal.

More particularly, according to one embodiment of the invention, the gating circuit passes negative pulses when the potential of the control signal is at a low voltage level. In this embodiment, the diode has its anode connected to the reference potential source, the magnitude of the reference potential being substantially equal to the low voltage level of the control signal. Accordingly, when the potential of the control signal is at its low level, the negative pulses will be passed by the diode. On the other hand, when the potential of the control signal is at a higher voltage level, the diode is back-biased and blocks the pulses.

According to another embodiment of this invention, the gating circuit passes positive pulses when the potential of the control signal is at a high voltage level. In this embodiment, the diode connections are reversed and the reference potential source is connected to the cathode, the voltage of the reference potential being substantially equal to the high voltage level of the control signal. Positive pulses are passed when the potential of the control signal is at its high voltage level and are blocked when the potential of the control signal is at a low voltage level.

Since the diode in each embodiment passes pulses when operating in the forward direction, the impedance of the gating circuit of this invention is very low thereby eliminating internal losses of pulse magnitude. In addition, in each embodiment the means for biasing the other electrode of the diode in accordance with the potential of the control signal includes a second diode which prevents loading of the control signal source during operation of the gating circuit. Furthermore, although the invention is disclosed in connection with diodes, it should be apparent that any other types of unidirectional current devices are equally applicable.

It is, therefore, an object of this invention to provide a diode gating circuit which is fast acting but imposes relatively negligible loading upon the source of control signals.

Another object is to provide a diode gating circuit which is fast acting and has a relatively low output impedance.

A further object of the invention is to provide a diode gating circuit in which the diode for passing the applied pulses is back-biased by the control signal whenever the potential of the control signal is different from its pulse passing potential.

Still another object is to provide a diode gating circuit in which the diode for passing the applied pulses has two potentials applied to the electrodes thereof, respectively, one of the potentials being a reference potential, and the other of the potentials being variable in accordance with the potential of the control signal.

An additional object is to provide a diode gating circuit including a diode for passing the applied pulses and means for controlling the operation of the diode in accordance with the potential of the control signal, the means including another diode for limiting the loading on the control signal source.

A still further object of the invention is to provide a diode gating circuit including a pair of unidirectional current devices, one device being utilized to gate the applied pulses and the other device being utilized to control the operation of the gating device.

The novel features which are believed to be characteristic of the invention, both as to its organization and method of operation, together with further objects and advantages thereof, will be better understood from the following description considered in connection with the accompanying drawings in which two embodiments of the invention are illustrated by way of examples. It is to be expressly understood, however, that the drawings are for the purpose of illustration and description only, and are not intended as a definition of the limits of the invention.

Figure 1:
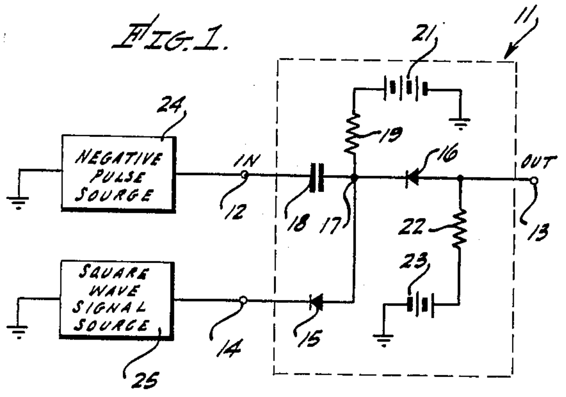
Fig. 1 is a circuit diagram of one embodiment of the diode gating circuit of this invention.

Referring now to the drawings, there is shown in Fig. 1 a pulse gating circuit 11 according to this invention, which is capable of selectively passing negative pulses, gating circuit 11 including an input terminal 12, an output terminal 13, and a control terminal 14. Connected between terminals 13 and 14 is a unidirectional current path including a pair of unidirectional devices, such as crystal diodes 15 and 16, diode 15 having its cathode connected to terminal 14 and diode 16 having its anode connected to terminal 13.

The common junction 17 of diodes 15 and 16 is coupled to input terminal 12 through a capacitor 18 which serves to isolate terminal 12 from the direct-current potentials set forth below. Junction 17 is connected through a load resistor 19 to the positive terminal of a source of direct-current potential, such as a battery 21, the negative terminal of battery 21 being grounded. Output terminal 13 is connected through an output load resistor 22 to the positive terminal of another source of direct-current potential, such as a battery 23, the other terminal of battery 23 being grounded. Battery 23 constitutes a source of direct-current reference potential, as explained more fully below. In operation, input terminal 12 is connected to a source 24 of negative pulses to be selectively passed, and control terminal 14 is connected to a variable potential control signal source, such as a square wave signal source 25 which controls the selectivity of gating circuit 11. Source 25 may be any suitable source of a signal of alternate relatively high and relatively low voltage levels, such as a conventional multivibrator or flip-flop circuit.

Figure 2:
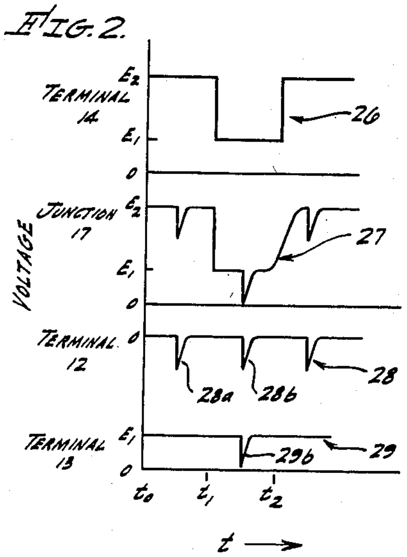
Fig. 2 is a composite diagram of the waveforms of signals occurring at various points in the circuit of Fig. 1.

Referring now to Fig. 2, there is shown a composite diagram of the waveforms of the signals appearing at various points in the gating circuit of Fig. 1. The gating signal, generally designated 26, applied to control terminal 14 from source 25 may be at either of two voltage levels $E_1$ and $E_2$. The voltage level of battery 23 is preferably substantially equal to low voltage level $E_1$ of signal 26, while the voltage level of battery 21 is greater than or equal to high voltage level $E_2$ of signal 26.

It is assumed that signal 26 is initially at its high voltage level $E_2$, as shown at time $t_0$ in Fig. 2. Under these conditions, the signal, generally designated 27, appearing at junction 17 will be at a voltage level equal to level $E_2$ owing to the clamping action of diode 15. Since the voltage level of battery 23 is substantially equal to level $E_1$, diode 16 will be back-biased by an amount equal to the difference between levels $E_2$ and $E_1$. Accordingly, if the signal, generally designated 28, applied to input terminal 12 from source 24 includes a negative pulse 28*a* whose amplitude is less than or equal to the difference between levels $E_2$ and $E_1$, diode 16 will block this pulse. The signal, generally designated 29, appearing at output terminal 13 will remain substantially constant at voltage level $E_1$ during the interval that signal 26 is at high voltage level $E_2$.

Assume now that signal 26 changes from high voltage level $E_2$ to low voltage level $E_1$ at time $t_1$. Under these conditions, the potential at junction 17 falls toward low voltage level $E_1$ and capacitor 18 will begin to discharge. It should be noted that, during the discharge period of capacitor 18, the current may flow between junction 17 and ground through two parallel paths. The first current path is through resistor 19, which is of relatively high resistance, and battery 21, while the second path is through the forward resistance of diode 15, which is of relatively negligible resistance, and the output resistance of signal source 25. If, as set forth above, source 25 is a flip-flop circuit and the low voltage level indicates that terminal 14 is connected to the conducting section of the flip-flop circuit, then the output resistance of source 25 will be relatively low, as compared with the resistance of resistor 19. Accordingly, the resistance of the discharge path is relatively small, and point 17 will fall very rapidly to voltage level $E_1$, as shown in Fig. 2.

With junction 17 at low voltage level $E_1$ at time $t_1$, the back-biasing against diode 16 is removed, and a negative pulse 28*b* of signal 28 will be passed by diode 16 and appear at terminal 13 as an output pulse 29*b* of signal 29. In other words, any negative pulse appearing at input terminal 12 during the interval that the potential at control terminal 14 is at low voltage level $E_1$ corresponding to the reference level from battery 23 will be passed by gating circuit 11 and appear as an output pulse at output terminal 13. Stated differently, gating circuit 11 may be considered as a coincidence circuit for producing an output pulse whenever an input pulse coincides in time with the low voltage level on terminal 14, and for inhibiting any output pulses whenever the control signal is at its high voltage level.

If signal 26 changes from low voltage level $E_1$ to high voltage level $E_2$ at time $t_2$, capacitor 18 begins to recharge to raise the potential at junction 17 to high voltage level $E_2$. During the charging period, however, diode 15 is back-biased by high voltage level $E_2$ on its cathode. Accordingly, the charging path is through the relatively high resistance of resistor 19, and the rise time of signal 27 is not as rapid as the fall time, as shown in Fig. 2. With the potential of junction 17 at voltage level $E_2$, diode 16 will again be back-biased and block the pulses of signal 28 from output terminal 13.

It is thus seen that the gating circuit of Fig. 1 turns on very rapidly, in response to the low voltage level of the control signal, to produce negative pulses on its output terminal. For example, it has been found that if capacitor 18 has a capacity of 330 micro-microfarads and resistor 19 has a resistance of 68 kilohms, the turn-on time of circuit 11 is of the order of one microsecond. In addition, any negative pulse applied to junction 17 will lower the voltage level at junction 17 below the level at terminal 14 thereby back-biasing diode 15. Accordingly, the load impedance placed upon source 25 by gating circuit 11 is relatively high and, therefore, the loading on source 25 is relatively small. Furthermore, since diode 16 operates in the forward direction in passing the negative pulses, the driving impedance of the gating impedance of gating circuit 11 is very small thereby reducing internal losses in the gating circuit to a minimum.

Although the gating circuit of Fig. 1 operates to pass negative pulses in response to low level control signals, it should be understood that the invention may also be applied to positive pulses and to high level gating signals. Another embodiment of the gating circuit according to this invention, which operates to pass positive pulses in response to high level control signals, is shown in Fig. 3.

Figure 3:
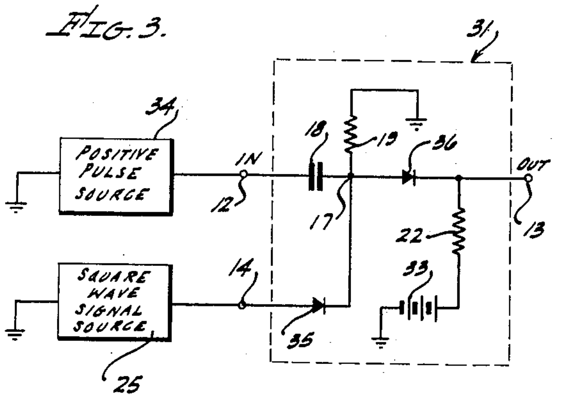
Fig. 3 is a circuit diagram of another embodiment of the diode gating circuit of this invention.

Referring now to Fig. 3, there is shown a gating circuit 31 including input, output, and control terminals 12, 13, and 14, respectively, identical to the terminals of Fig. 1. As in Fig. 1, squarewave signal source 25 is connected to control terminal 14, while load resistor 22 is connected to output terminal 13. Resistor 22 is again connected to the positive terminal of a battery which is designated 33 in Fig. 3 since its voltage level is substantially equal to high voltage level $E_2$ instead of low level $E_1$ as in Fig. 1.

Connected between terminals 13 and 14 is a unidirectional current path including a pair of diodes 35 and 36 corresponding to diodes 15 and 16, respectively, of Fig. 1. In Fig. 3, the diode connections are reversed, that is the cathode of diode 36 is connected to terminal 13 while the anode of diode 35 is connected to terminal 14. The common junction 17 of the diodes is again coupled through capacitor 18 to terminal 12 which is connected to a positive pulse source 34. Junction 17 is again connected to one end of resistor 19 which has its other end grounded.

Figure 4:
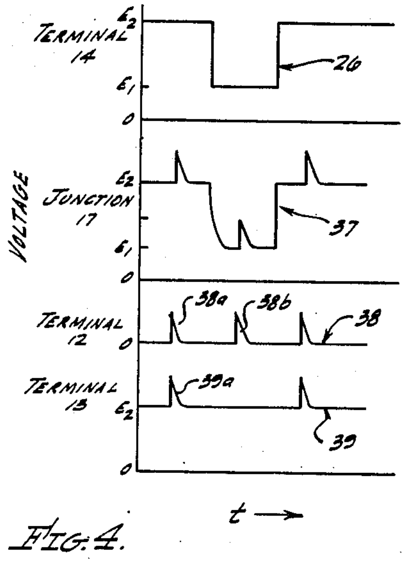
Fig. 4 is a composite diagram of the waveforms of signals occurring at various points in the circuit of Fig. 3.

In operation, gating circuit 31 passes an input pulse when the control signal applied to control terminal 14 is at its high voltage level, and inhibits an input pulse when the control signal is at its low voltage level. For example, if signal 26 from source 25 is at its high voltage level $E_2$, as shown in Fig. 4, then signal 37 at junction 17 of Fig. 3 is also at level $E_2$. Since signal 39 is held at level $E_2$ by battery 33, any positive pulse *38a* of signal 38 from source 34 will raise the voltage level of signal 37 at junction 17 above the level $E_2$ at terminal 13. Under these conditions, diode 36 will pass pulse *38a* and produce a pulse *39a* in signal 39, as shown in Fig. 4.

On the other hand, if signal 26 is at low voltage level $E_1$, signal 37 at junction 17 is also at low voltage level $E_1$ and diode 36 is back-biased by an amount equal to the difference between levels $E_2$ and $E_1$. Under these conditions, any positive pulse *38b* of signal 38 will be blocked by diode 36 if the maximum amplitude of the pulse is less than the back-biasing, as shown in Fig. 4.

It should be noted that the turn-on time, for gating circuit 31, that is the time required to raise the level of junction 17 from $E_1$ to $E_2$, is also very short, as shown in Fig. 4. This is due to the fact that capacitor 18 charges from level $E_1$ to level $E_2$ through the low forward resistance of diode 35 and the relatively low resistance of source 34. On the other hand, the turn-off time is not quite as rapid, since diode 35 is back-biased under these conditions and the discharge path includes the relatively high resistance of resistor 19.

The driving impedance of gating circuit 31 is relatively low, since diode 36 is operating in the forward direction when passing pulses from input terminal 12 to output terminal 13. In addition, since the application of a positive pulse to junction 17 back-biases diode 35, source 25 is effectively isolated from the positive pulses. Accordingly, the loading of the control signal source is relatively small.

In some instances, it may be desirable to prevent any spurious signals from leaking back through diode 15 in Fig. 1, or diode 35 in Fig. 3, and inadvertently operating the control signal source. This result may be accomplished by connecting a resistor in series with the diode, or by connecting a capacitor across the control signal source. The resistor would serve as a voltage divider to dissipate a portion of the leakage pulse, while the capacitor would by-pass any leakage pulses.

It should be noted that, in each of the described embodiments, both of the voltage levels of the control signal have been assumed to be positive with respect to ground, and the output signal has been assumed to include a direct-current voltage level. Obviously, the circuits of this invention may be utilized with control signals in which either or both voltage levels are negative with respect to ground. In addition, the direct-current voltage level of the output signal may be removed in any well-known manner, such as capacitive coupling between the output terminal and an output circuit.

In both of the described embodiments of the invention, the control signal and the pulse signal both have been assumed to be periodic, and the control signal has been shown as being of symmetrical squarewave configuration. It should be apparent, however that the gating circuits of this invention are also applicable to aperiodic pulse signals, and to aperiodic and unsymmetrical control signals.

What is claimed as new is:

1. A diode gating circuit for passing an applied input pulse when the input pulse coincides in time with a predetermined voltage level of a variable voltage level control signal, said gating circuit comprising: an output terminal; a reference potential source electrically connected to said output terminal for maintaining the direct-current potential at said output terminal at a voltage level substantially equal to the predetermined voltage level; a control terminal for receiving the control signal; a unidirectional current path electrically connected between said output terminal and said control terminal, said path including a common junction, a first diode having a first electrode connected to said output terminal and a second electrode connected to said common junction, and a second diode having a first electrode connected to said control terminal and a second electrode connected to said common junction; an electrically conductive path connected to said common junction for maintaining the direct-current potential at said common junction at a voltage level substantially equal to the voltage level of the control signal to back-bias said first diode when the voltage level of the control signal is different from the predetermined voltage level; and an input terminal for receiving the pulse to be passed, said input terminal being electrically coupled to said common junction.

2. The gating circuit defined in claim 1, wherein said conductive path includes a source of direct-current potential and a resistor electrically connected between said source of direct-current potential and said common junction.

3. A diode gating circuit for passing an applied input pulse when the input pulse coincides in time with a predetermined voltage level of a variable voltage level control signal, said gating circuit comprising: an output terminal; a reference potential source electrically connected to said output terminal for maintaining the direct-current potential at said output terminal at a voltage level substantially equal to the predetermined voltage level; a first diode having first and second electrodes, the first electrode of said first diode being connected to said output terminal; an input terminal for receiving the pulse to be passed, said input terminal being electrically coupled to the second electrode of said first diode; a control terminal for receiving the control signal; and electrical biasing means for maintaining the direct-current potential at the second electrode of said first diode at a voltage level substantially equal to the voltage level of the control signal, said biasing means including a second diode electrically connected between said control terminal and the second electrode of said first diode.

4. A diode gating circuit for passing an applied input pulse when the input pulse coincides in time with a predetermined voltage level of a variable voltage level control signal, said gating circuit comprising: an output terminal; means electrically connected to said output terminal for maintaining the direct-current potential at said output terminal at a voltage level substantially equal to the predetermined voltage level; a diode having first and second electrodes, the first electrode of said diode being connected to said output terminal; an input terminal for receiving the pulse to be passed, said input terminal being electrically coupled to the second electrode of said diode; and electrical biasing means, including a unidirectional current device connected between said control terminal and said second electrode, for maintaining the direct-current potential at said second electrode at a voltage level substantially equal to the voltage level of the control signal.

5. The gating circuit defined in claim 4, wherein said first and second electrodes are the cathode and anode, respectively.

6. The gating circuit defined in claim 4, wherein said first and second electrodes are the anode and cathode, respectively.

7. A diode gating network for selectively passing applied electrical pulses in response to a predetermined voltage level of a variable voltage level control signal, said network comprising: an input terminal for receiving the electrical pulses to be passed; an output terminal; an electrical circuit for selectively applying the pulses appearing at said input terminal to said output terminal, said circuit including a unidirectional current device having first and second terminals; first biasing means electrically coupled to the first terminal of said unidirectional device for maintaining the direct-current potential at said first terminal at a voltage level substantially equal to said predetermined level; and second biasing means, including a non-linear impedance element connected between said control terminal and the second terminal of said unidirectional device, responsive to the control signal for maintaining the potential at said second terminal at a voltage level substantially equal to the instantaneous voltage level of the control signal.

References Cited in the file of this patent

UNITED STATES PATENTS

| Number | Name | Date |
|---|---|---|
| 2,517,404 | Morton | Aug. 1, 1950 |
| 2,557,729 | Eckert | June 19, 1951 |

OTHER REFERENCES

Vol. 19, Radiation Lab. Series, pp. 365, 366.